US012286037B2

(12) United States Patent
Zuo et al.

(10) Patent No.: US 12,286,037 B2
(45) Date of Patent: Apr. 29, 2025

(54) AUTOMOBILE SEAT INTEGRATED WITH HEIGHT ADJUSTMENT AND ANGLE ADJUSTMENT

(71) Applicant: Magna Seating Research & Development (Chongqing) Co., Ltd., Chongqing (CN)

(72) Inventors: Jiale Zuo, Shanghai (CN); Guogang Chen, Shanghai (CN); Lei Xue, Shanghai (CN)

(73) Assignee: Magna Seating Research & Development (Chongqing) Co., Ltd., Chongqing (CN)

( * ) Notice: Subject to any disclaimer, the term of this patent is extended or adjusted under 35 U.S.C. 154(b) by 119 days.

(21) Appl. No.: 18/146,285

(22) Filed: Dec. 23, 2022

(65) Prior Publication Data

US 2023/0166643 A1    Jun. 1, 2023

Related U.S. Application Data

(63) Continuation of application No. PCT/CN2022/117026, filed on Sep. 5, 2022.

(30) Foreign Application Priority Data

Nov. 28, 2021    (CN) .......................... 202111426848.7

(51) Int. Cl.
*B60N 2/16*    (2006.01)
(52) U.S. Cl.
CPC ......... *B60N 2/1695* (2013.01); *B60N 2/1615* (2013.01); *B60N 2/164* (2013.01)

(58) Field of Classification Search
CPC .................................................... B60N 2/1695
See application file for complete search history.

(56) References Cited

U.S. PATENT DOCUMENTS

| 2009/0088930 A1* | 4/2009 | Ohtsubo | B60N 2/1615 |
| | | | 297/316 |
| 2018/0001793 A1* | 1/2018 | Pleskot | B60N 2/1695 |
| 2020/0262319 A1* | 8/2020 | Abe | B60N 2/02253 |

FOREIGN PATENT DOCUMENTS

| CN | 203172463 U | | 9/2013 | |
| CN | 112977187 A | * | 6/2021 | ........... B60N 2/0232 |
| CN | 113968176 A | * | 1/2022 | |

(Continued)

*Primary Examiner* — Timothy J Brindley

(57) ABSTRACT

An automobile seat integrated with height adjustment and angle adjustment comprises a seat body comprising a pedestal skeleton and a backrest skeleton, a height adjustment mechanism comprising a bottom support, a rear connection rod, an upper connection rod and a front connection rod and an angle adjustment mechanism comprising the bottom support, an angle adjustment connection rod, a driving connection rod, a front connection rod and the upper connection rod, the bottom support, the front connection rod and the upper connection rod are common parts of the height adjustment mechanism and the angle adjustment mechanism, the bottom support, the rear connection rod, the upper connection rod and the front connection rod are successively adjacently connected by rotating pairs, and the rear connection rod is connected with a height adjustment driving source which drives the rear connection rod to move when working to realize the height adjustment of the automobile seat.

11 Claims, 6 Drawing Sheets

(56) References Cited

FOREIGN PATENT DOCUMENTS

| | | | | |
|---|---|---|---|---|
| CN | 114379429 | A | | 4/2022 |
| DE | 102016222192 | A1 * | 5/2018 | ............... B60N 2/02 |
| KR | 102235731 | B1 * | 4/2021 | |
| KR | 20240016050 | A * | 2/2024 | |
| KR | 20240033822 | A * | 3/2024 | |

* cited by examiner

AUTOMOBILE SEAT INTEGRATED WITH HEIGHT ADJUSTMENT AND ANGLE ADJUSTMENT

CROSS-REFERENCE TO RELATED APPLICATIONS

This application is a continuation of International Patent Application No. PCT/CN2022/117026 with a filing date of Sep. 5, 2022, designating the United States, now pending, and further claims priority to Chinese Patent Application No. 202111426848.7 with a filing date of Nov. 28, 2021. The content of the aforementioned applications, including any intervening amendments thereto, are incorporated herein by reference.

TECHNICAL FIELD

The disclosure relates to the technical field of automobile seat adjustment, particularly to an automobile seat integrated with height adjustment and angle adjustment.

BACKGROUND OF THE PRESENT INVENTION

With the increasing development of automotive technology, the safety and comfort of an automobile seat closely contacting with a driver draws more and more attentions. How to better provide a convenient automobile seat adjustment function for the driver or passengers has become a research hotspot.

An end user has higher and higher requirements on seat attitude adjustment, such as for seat inclined angle adjustment and seat height adjustment. However, for the two adjustment functions, most of the currently existing adjustment devices adopt independent adjustment, such as height adjustment, the existing scheme is that a four-connection rod form, E-pump motor (i.e., gear motor) drive and gear drive are adopted, or a four-connection rod form, screw motor drive and screw drive are adopted, such as inclined angle adjustment, seat pan front inclined angle adjustment and screw motor drive, etc.; a rocker sliding block form is adopted, the maximum angle of the inclined angle adjustment is basically fixed at about 10°, or, for example, a rocker sliding block device is used, two screw motors directly push the seat upward to move so that the seat is in a large inclined angle of about 20°. However, to realize the above angle and height adjustments, it is needed to adopt two sets of independent mechanisms. The seats with the two functions have no advantages in the aspects of space and cost, especially for electrical automobiles having smaller and smaller seat height adjustment requirements, the design using the existing technology has no advantages in terms of space, and a lower seat height is conducive to increasing more battery spaces to potentially prolong the endurance of the automobile. Therefore, reduction in seat height is a trend for automobile seats.

The height of the automobile seat is an important criterion of evaluating the quality of the automobile. At nowadays society, electric automobiles are increasingly popularized and applied with more and more serious pollution and short resources. Thus, it is urgent to develop a new automobile seat integrated with height adjustment and angle adjustment in order to solve the problems in the prior art.

SUMMARY OF PRESENT INVENTION

The present application provides an automobile seat integrated with height adjustment and angle adjustment. Through the present application, the structure is simplified, which facilitates manufacturing, and reduces arrangement space and manufacturing cost, and allows the seat to smoothly move, thereby improving the comfort of passengers.

The present application is realized through the following technical solution: an automobile seat integrated with height adjustment and angle adjustment, comprising a seat body, the seat body comprising a pedestal skeleton and a backrest skeleton, wherein the automobile seat also comprises a height adjustment mechanism comprising a bottom support, a rear connection rod, an upper connection rod and a front connection rod and an angle adjustment mechanism comprising the bottom support, an angle adjustment connection rod, a driving connection rod, a front connection rod and the upper connection rod, the bottom support, the front connection rod and the upper connection rod are common parts of the height adjustment mechanism and the angle adjustment mechanism, the bottom support, the rear connection rod, the upper connection rod and the front connection rod are connected with each other by rotating pairs, the rear connection rod is connected with a height adjustment driving source which drives the rear connection rod to move when working so as to realize the height adjustment of the automobile seat, the front end of the bottom support is connected to the middle of the angle adjustment connection rod by a rotating pair, the front end of the angle adjustment connection rod is connected to the bottom end of the front connection rod by a rotating pair, the other end of the adjustment connection rod is connected to one end of the driving connection rod by a rotating pair, the other end of the driving connection rod is connected with the bottom support by a rotating pair, the driving connection rod is connected with the angle adjustment driving source, and the driving connection rod drives the angle adjustment connection rod to move along the body of the driving connection rod when the angle adjustment driving source works so as to realize the angle adjustment of the automobile seat.

Preferably, the driving connection rod comprises a sliding block and a sliding rod, the rear end of the sliding rod is connected with the middle of the bottom support by a rotating pair, the sliding block slides on the sliding rod under the driving of an external force, and the sliding block is connected with the angle adjustment connection rod by a rotating pair.

Preferably, the middle of the angle adjustment connection rod is connected with the front end of the bottom support by a rotating pair, one end of the angle adjustment connection rod is located at the front end of the bottom support, and the other end of the angle adjustment connection rod is located on the upper part of the bottom support.

Preferably, the specific rotating pair structure adopts a hinge or bisagra form.

Preferably, the bottom support is fixed on an automobile body frame, an automobile body or a sliding rail.

Preferably, the upper connection rod is fixed on the side plate of the pedestal skeleton, or the upper connection rod is directly replaced by the pedestal skeleton.

Preferably, the height adjustment driving source and the angle adjustment driving source separately and independently works.

As a preferred embodiment of the present application, the height adjustment driving source uses an E-pump motor to drive the movement of a gear plate.

Preferably, the angle adjustment driving source uses electric drive, hydraulic drive, pneumatic drive or solenoid drive.

Preferably, the angle adjustment connection rod is divided into two sections by a rotating pair, an included angle is formed between the axes of the two sections of angle adjustment connection rods, and the included angle is an acute angle, a right angle or an obtuse angle.

Preferably, the included angle between the axes of the two sections of angle adjustment connection rods is an acute angle of 15-85 degrees, 30-80 degrees, 35-75 degrees or 40-70 degrees, and such the acute angle allows the angle adjustment connection rod to realize the in-situ large angle adjustment of the whole angle adjustment mechanism through small-range movement, so that the seat body forms a large inclined angle state in situ or resets from the large inclined angle state.

Preferably, the middle of the bottom support that is combined with the rear end of the sliding rod is a branch upward extending from the middle of the bottom support so as to fix the rotating pair, the branch is fixed on the upper part of the middle of the bottom support, or the branch is integrated with the bottom support, which is more conductive to physical and mechanical transfer between the connection rods at the same time.

Preferably, the middle is defined as being spaced from ⅓-⅔ of two endpoints of the rod in the length direction of the bottom support or the angle adjustment connection rod.

Herein, the term "integration of height adjustment and angle adjustment" refers to integration of a height adjustment mechanism and an angle adjustment mechanism, especially refers to a fact that the height adjustment mechanism and the angle adjustment mechanism comprise more than one, preferably more than two, more preferably more than three common parts, especially common moveable parts and relatively fixed parts matched with the moveable parts, the movement and matching of the common parts can simultaneously take the effects of adjusting the height of the automobile seat and the inclined angle of the automobile seat.

In the disclosure, a motor for driving the movement of the connection rod can adopt a motor type commonly used in the field, including but not limited to the E-pump motor.

For the electric automobile, it is a trend to pursue a small seat height, which can improve the riding comfort of many drivers and passengers. However, in another aspect, increase in seat height is conducive to increase in more battery space so as to prolong the endurance of the automobile. To achieve the preferred balance of the two pursues, it is a reasonable selection to control the seat height of the electric automobile in an appropriate range.

The design concept of the disclosure is that the height adjustment and the angle adjustment of the seat can be simultaneously achieved, and meanwhile the seat height of the automobile is reduced. In view of this, the inventors adopt two sets of motors to dexterously share some structure parts for height adjustment and angle adjustment, the height adjustment and angle adjustment functions of the automobile seat need to be separated because each customer has different demands to respectively independently take effects to meet user's riding comfort needs. Therefore, when the height adjustment is performed in the present application, a key part of angle adjustment-angle connection rod is fixed, when the angle adjustment is performed, a key part of height adjustment-rear connection rod is fixed, and then it is realized that two different function adjustments can be independently performed without affecting each other.

The disclosure has the following beneficial effects: two sets of independent motors are used to respectively achieve the height adjustment and angle adjustment of the automobile seat, the two sets of motors respectively independently work without mutual interference, the structures of the common structure parts are greatly simplified to facilitate production and manufacturing, and the arrangement space and manufacturing cost of the seat are reduced so that the automobile seat more stably moves to further improve the comfort of the seat.

DETAILED DESCRIPTION OF PREFERRED EMBODIMENTS

Next, the embodiments of the disclosure will be described in detail in combination with accompanying drawings. This example is implemented on the premise of the technical solution of the disclosure and gives detailed embodiments and specific operation process, however, the protective scope of the disclosure is not limited to the following example.

Figure 1:
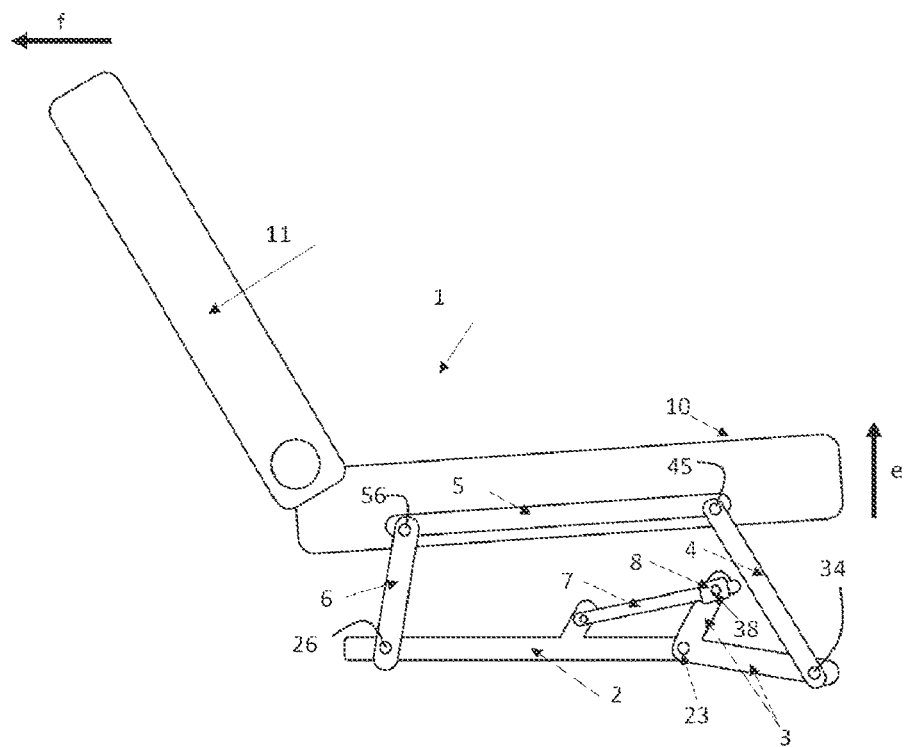
FIG. 1 is a diagram of an entire structure according to the disclosure.

As shown in FIG. 1, an automobile seat integrated with height adjustment and angle adjustment comprises a seat body 1, the seat body 1 comprising a pedestal skeleton 10 and a backrest skeleton 11, and also comprises a height adjustment mechanism comprising a bottom support 2, a rear connection rod 6, an upper connection rod 5 and a front connection rod 4 and an angle adjustment mechanism comprising the bottom support 2, an angle adjustment connection rod 3, a driving connection rod, the front connection rod 4 and the upper connection rod 5, the bottom support 2, the front connection rod 4 and the upper connection rod 5 are common parts of the height adjustment mechanism and the angle adjustment mechanism, the bottom support 2 is fixed on the automobile body frame, the automobile body or the sliding rail. The upper connection rod 5 is fixed on the side plate of the pedestal skeleton, or the upper connection rod is directly replaced by the pedestal skeleton.

The bottom support 2, the rear connection rod 6, the upper connection rod 5 and the front connection rod 4 are connected with each other by rotating pairs, the rear connection rod 6 is connected with an E-pump motor, the E-pump motor drives the rear connection rod 6 to rotate when working and then the height adjustment of the automobile seat is achieved.

The driving connection rod comprises a sliding block 8 and a sliding rod 7, the rear end of the sliding rod 7 is connected with the middle of the bottom support 2 by a rotating pair, the front end of the bottom support 2 is connected to the middle of the angle adjustment connection rod 3 by a rotating pair, the angle adjustment connection rod 3 is divided into two sections, and an acute angle, a right angle or an obtuse angle is formed between the axes of the two sections. One of the two sections is located between the rotating pair 23 and the rotating pair 38, and the other of the two sections is located between the rotating pair 23 and the rotating pair 24. One end of the angle adjustment connection rod 3 is located at the front end of the bottom support 2, and the other end of the angle adjustment connection rod 3 is located above the bottom support.

Preferably, the included angle between the axes of the two sections of angle adjustment connection rods is an acute angle of 15-85 degrees, preferably 30-80 degrees, preferably 35-75 degrees, more preferably 40-70 degrees. Such the acute angle structure allows the angle adjustment connection rod 3 to realize the in-situ large angle adjustment of the whole angle adjustment mechanism through small-range movement, so that the seat body 1 forms a large inclined angle state (lean back) in situ or resets from the large inclined angle state (lean back).

In another alternative embodiment, the middle of the bottom support 2 that is combined with the rear end of the sliding rod 7 is a branch upward extending from the middle of the bottom support so as to fix the rotating pair 27. The branch is fixed on the upper part of the middle of the bottom support 2, or the branch is integrated with the bottom support 2. The arrangement of the branch is not only beneficial to a fact that the driving device (a height adjustment driving source and an angle adjustment driving source, not shown) for driving the height adjustment mechanism and the angle adjustment mechanism to work has more selections compared with arrangement position/space of a screw motor and the like, but also conducive to maintaining the structural integrity of the bottom support 2, thereby guaranteeing that the bottom support 2 has enough mechanical strength and service life.

The middle in this example is defined as being spaced from ⅓-⅔ of two endpoints of the rod in the length direction of the bottom support or the angle adjustment connection rod.

The front end of the angle adjustment connection rod 3 is connected with the bottom end of the front connection rod 4 by the rotating pair, the other end of the angle adjustment connection rod 3 is connected with the sliding block 8 by the rotating pair, the driving connection rod is connected with a screw motor, the sliding block 8 slides on the sliding rod 7 when the screw motor works, the driving connection rod drives the angle adjustment connection rod 3 to move along the body of the driving connection rod, and then the angle adjustment of the seat is realized. The height adjustment driving source and the angle adjustment driving source separately and independently works. The specific rotating pair structure can use a hinge.

The rotating pairs in the present application can be identical. To facilitate the description of a connection structure relationship between the connection rods, the rotating pairs here are marked with different reference numbers for the only purpose of designating that there is no difference between structure positions: rotating pair 23; rotating pair 26; rotating pair 27; rotating pair 34; rotating pair 38; rotating pair 45; rotating pair 56; rotating pair 78.

Figure 2:
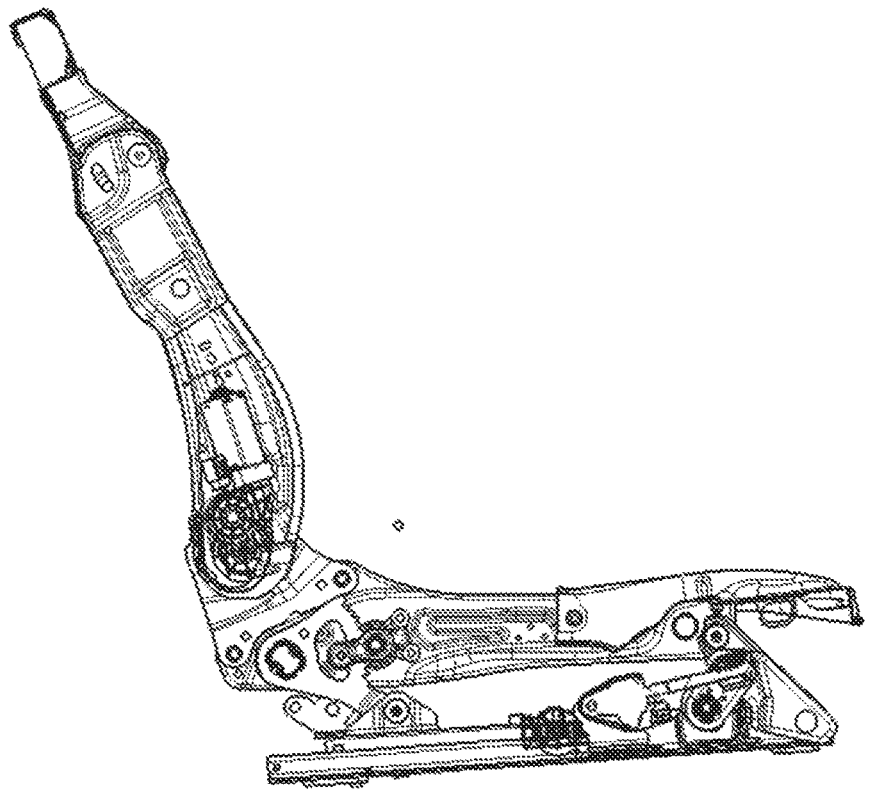
FIG. 2 is a structural diagram under a design angle state according to the disclosure.
Figure 3:
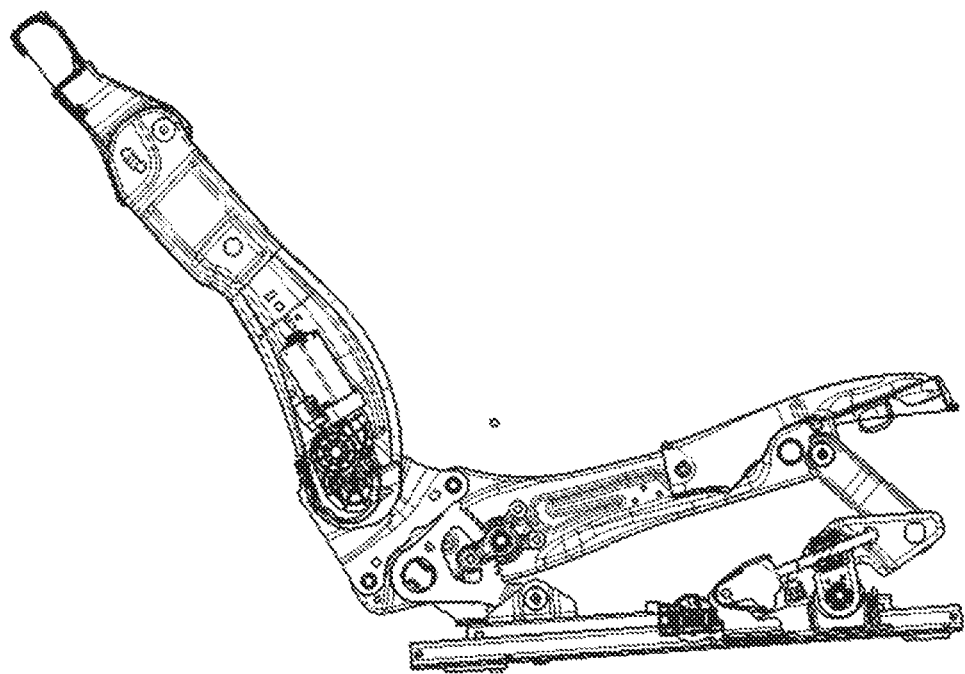
FIG. 3 is a structural diagram under an intermediate angle state according to the disclosure.
Figure 4:
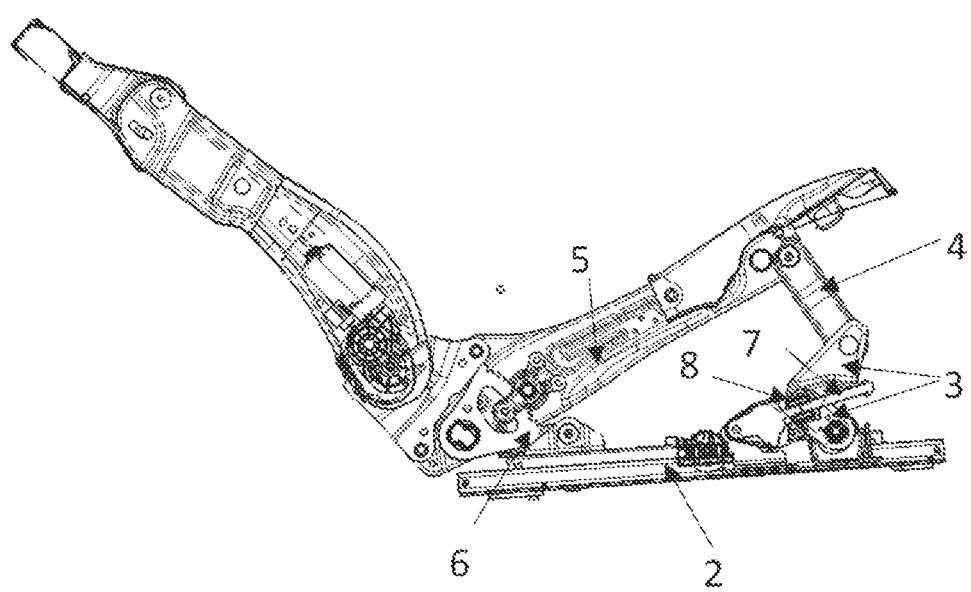
FIG. 4 is a structural diagram under a maximum angle state according to the disclosure.

As shown in FIG. 2, FIG. 3 and FIG. 4, FIG. 2, FIG. 3 and FIG. 4 are structural diagrams of a seat whose angle is in design, intermediate and maximum states. FIG. 4 includes a bottom support 2, an angle adjustment connection rod 3, a front connection rod 4, an upper connection rod 5, a rear connection rod 6, a sliding rod 7 and a sliding block 8. The seat in a state of FIG. 4 is suitable for lying down and resting of passengers.

Figure 5:
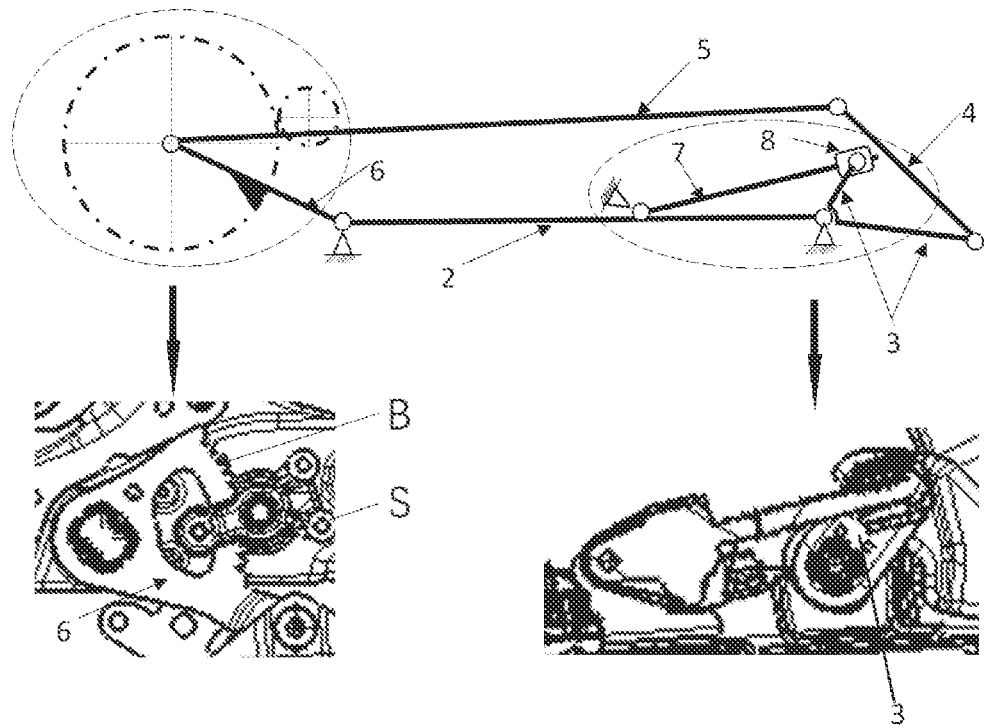
FIG. 5 is a structural diagram based on a mechanical driving principle according to the disclosure.

As shown in FIG. 5, FIG. 5 is a schematic diagram of a mechanical driving principle structure of an automobile seat. The left side represents the height adjustment mechanism, and the right side represents the angle adjustment mechanism. Where, the height adjustment mechanism uses the E-pump motor to drive the gear plate to move, B represents a big gear, and S represents a small gear. The angle adjusting mechanism adopts the screw motor, and 3 in the figure is the angle adjusting connection rod. Other reference numbers have the same meanings as above.

Figure 6:
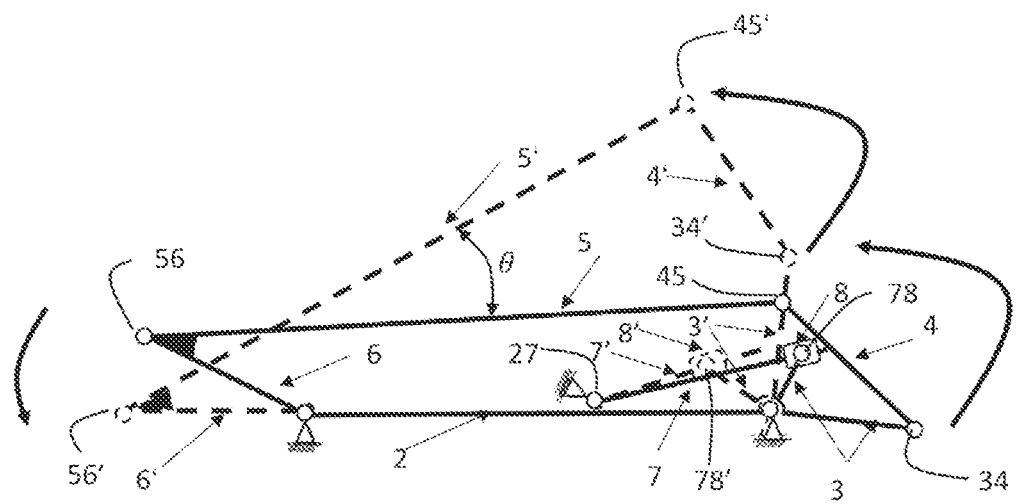
FIG. 6 is a structural diagram based on a mechanical analysis principle according to the disclosure.

As shown in FIG. 6, although the height adjustment mechanism and angle adjustment mechanism share some connection rods, the two mechanisms independently work when working. When the height adjustment mechanism functions, the E-pump motor drives the rear connection rod 6 to upward rotate, the rotation of the rear connection rod 6 drives the upper connection rod 5 to upward move, and the upper connection rod 5 upward moves and then drives the front connection rod 4 to forward rotate, thus realizing the height adjustment of the seat. It should be noted that the angle adjustment connection rod 3 is always in a locked state when the height of the seat is adjusted.

Figure 7:
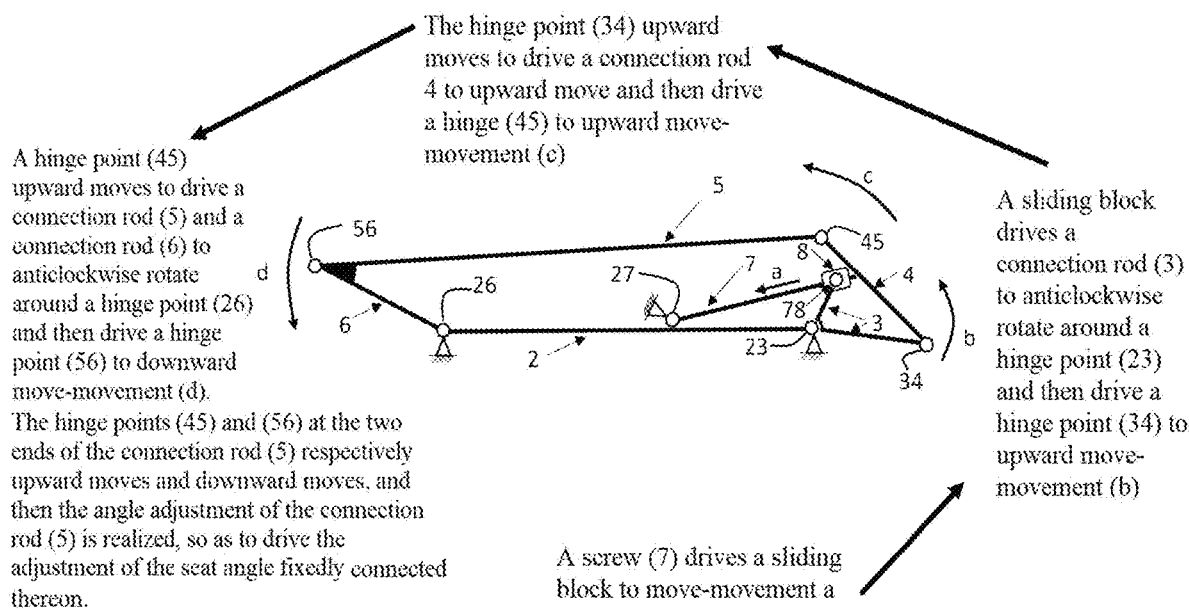
FIG. 7 is a structural diagram based on a mechanical movement mode according to the disclosure.

As shown in FIGS. 6 and 7, FIG. 7 is an analysis diagram of a mechanical movement mode of a seat angle from a design state to a maximum state. When the angle adjustment mechanism functions, the screw motor is turned on to drive the sliding block 8 to backward and downward slide on the sliding rod 7, thus driving the angle adjustment connection rod 3 between the rotating pair 23 and the rotating pair 38 to downward rotate. Under the action of the rotating pair 23, the angle adjustment connection rod 3 between the rotating pair 23 and the rotating pair 34 upward rotates, and then drives the front connection rod 4 to upward move. The front connection rod 4 upward moves to drive the upper connection rod 5 to backward rotate, thus realizing the angle adjustment of the seat. It is worth noting that the rear connection rod 6 is always in the locked state with respect to the upper connection rod 5 when the angle of the seat is adjusted.

Figure 8A:
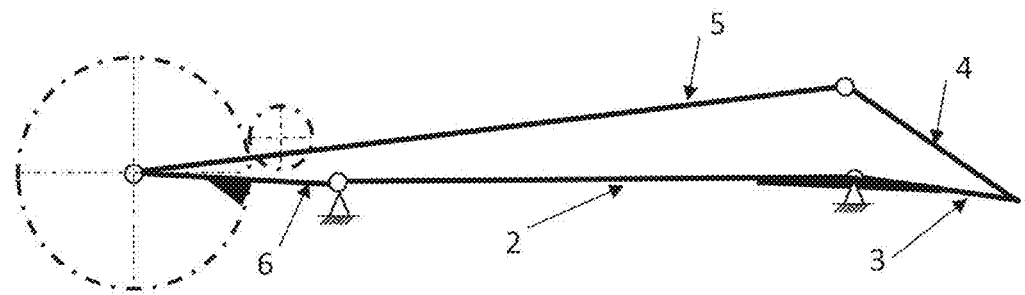
FIGS. 8A, 8B and 8C illustrate structural diagrams on a mechanical analysis principle at three height states.
Figure 8B:
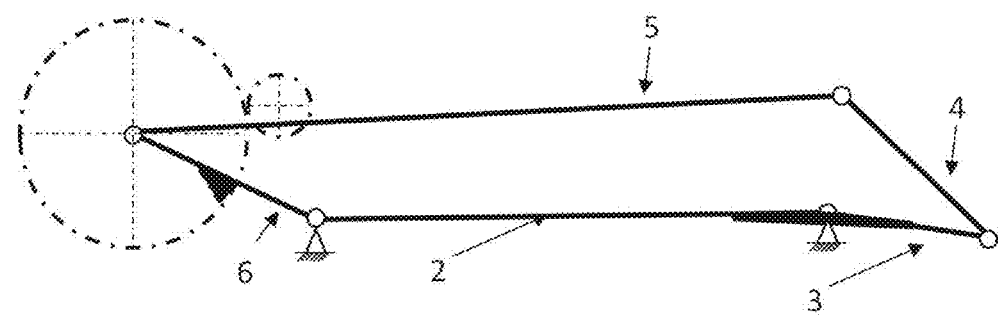
Figure 8C:
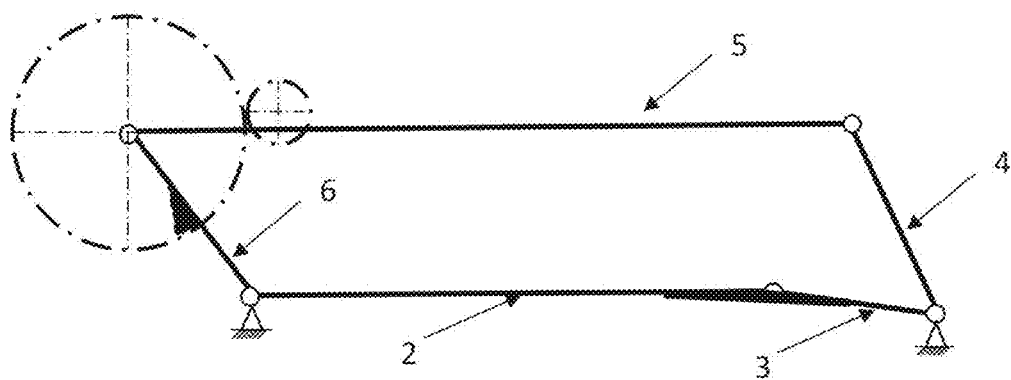

As shown in FIGS. 8A, 8B and 8C, FIG. 8A is a structural diagram based on a mechanical analysis principle under a design height state of a seat, FIG. 8B is a structural diagram based on a mechanical analysis principle under an intermediate height state of a seat, and FIG. 8C is a structural diagram based on a mechanical analysis principle under a maximum height state of a seat.

Figure 9A:
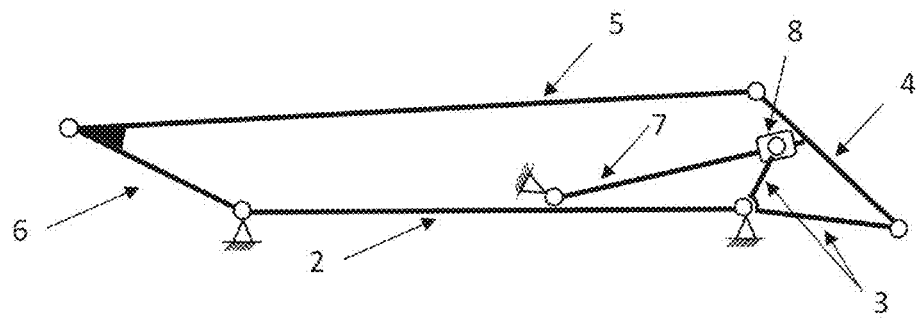
FIGS. 9A, 9B and 9C illustrate structural diagrams based on a mechanical analysis principle at three angle states as shown in FIG. 2, FIG. 3 and FIG. 4.
Figure 9B:
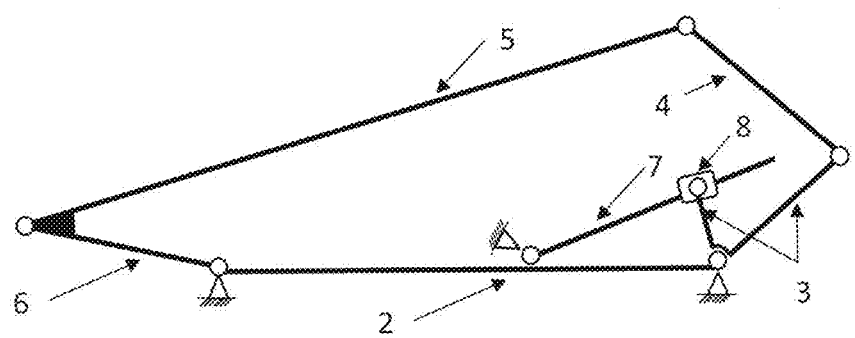
Figure 9C:
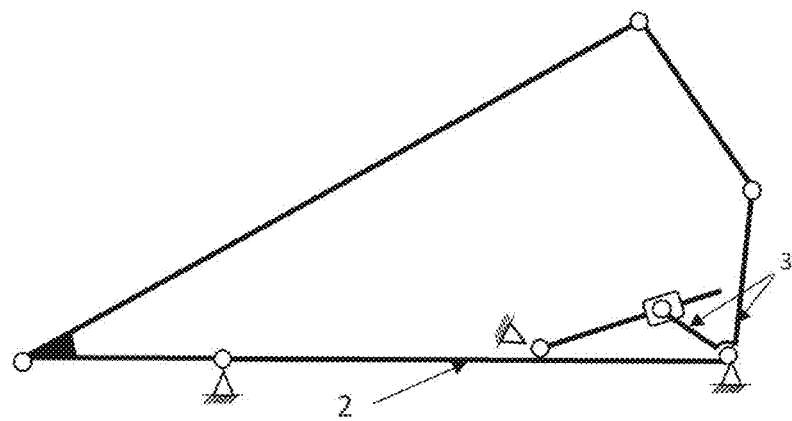

As shown in FIGS. 9A, 9B and 9C, FIG. 9A is a structure diagram of an automobile seat based on a mechanical analysis principle under a design angle state of a seat, FIG. 9B is a structure diagram of an automobile seat based on a mechanical analysis principle under an intermediate angle state of a seat, and FIG. 9C is a structural diagram of an automobile seat based on a mechanical analysis principle under a maximum angle state of a seat.

We claim:

1. An automobile seat integrated with height adjustment and angle adjustment, comprising: a seat body, the seat body comprising a pedestal skeleton and a backrest skeleton, wherein the automobile seat also comprises a height adjustment mechanism comprising a bottom support, a rear connection rod, an upper connection rod and a front connection rod and an angle adjustment mechanism comprising the bottom support, an angle adjustment connection rod, a driving connection rod, a front connection rod and the upper connection rod, the bottom support, the front connection rod and the upper connection rod are common parts of the height adjustment mechanism and the angle adjustment mechanism, the bottom support, the rear connection rod, the upper connection rod and the front connection rod are connected with each other by rotating pairs, the rear connection rod is connected with a height adjustment driving source which drives the rear connection rod to move when working so as to realize a height adjustment of the automobile seat, a front end of the bottom support is connected to a middle of the angle adjustment connection rod by a first rotating pair, a front end of the angle adjustment connection rod is connected to a bottom end of the front connection rod by a second rotating pair, a rear end of the angle adjustment connection rod is connected to one end of the driving connection rod by a third rotating pair, another end of the driving connection rod is connected with the bottom support by a fourth rotating pair, the driving connection rod is connected with an angle adjustment driving source, and the driving connection rod drives the angle adjustment connection rod to move along a body of the driving connection rod when the angle adjustment driving source works so as to realize an angle adjustment of the automobile seat; and wherein the angle adjustment connection rod is divided into two sections by the first rotating pair, an included angle is formed between axes of the two sections of the angle adjustment connection rod, and the included angle is an acute angle, a right angle or an obtuse angle.

2. The automobile seat according to claim 1, wherein the driving connection rod comprises a sliding block and a sliding rod, a rear end of the sliding rod is connected with a middle of the bottom support by the fourth rotating pair, the sliding block slides on the sliding rod under a driving of an external force, and the sliding block is connected with the angle adjustment connection rod by the third rotating pair.

3. The automobile seat according to claim 1, wherein the middle of the angle adjustment connection rod is connected with the front end of the bottom support by the first rotating pair, the front end of the angle adjustment connection rod is located in front of the front end of the bottom support, and the rear end of the angle adjustment connection rod is located above the bottom support.

4. The automobile seat according to claim 3, wherein a specific structure of each of the first rotating pair, the second rotating pair, the third rotating pair and the fourth rotating pair adopts a hinge or bisagra form.

5. The automobile seat according to claim 1, wherein the bottom support is fixed on an automobile body frame, an automobile body or a sliding rail.

6. The automobile seat according to claim 1, wherein the upper connection rod is fixed on a side plate of the pedestal skeleton, or the upper connection rod is directly replaced by the pedestal skeleton.

7. The automobile seat according to claim 1, wherein the height adjustment driving source and the angle adjustment driving source separately and independently work.

8. The automobile seat according to claim 1, wherein the height adjustment driving source uses an E-pump motor to drive a movement of a gear plate.

9. The automobile seat according to claim 1, wherein the angle adjustment driving source uses electric drive, hydraulic drive, pneumatic drive or solenoid drive.

10. The automobile seat according to claim 1, wherein the included angle between the axes of the two sections of the angle adjustment connection rod is the acute angle of 15-85 degrees, 30-80 degrees, 35-75 degrees or 40-70 degrees, such the acute angle structure allows the angle adjustment connection rod to realize the in-situ large angle adjustment of the entire angle adjustment mechanism through small-range movement, so that the seat body forms a large inclined angle state in situ or resets from the large inclined angle state.

11. The automobile seat according to claim 2, wherein the middle of the bottom support connected with the rear end of the sliding rod is a branch upward extending from the middle of the bottom support so as to fix the fourth rotating pair, the branch is fixed on the middle of the bottom support, or the branch is integrated with the bottom support.

\* \* \* \* \*